Jan. 22, 1935.　　　L. P. KONGSTED　　　1,989,057
ELECTRIC RELAY
Filed Sept. 2, 1932
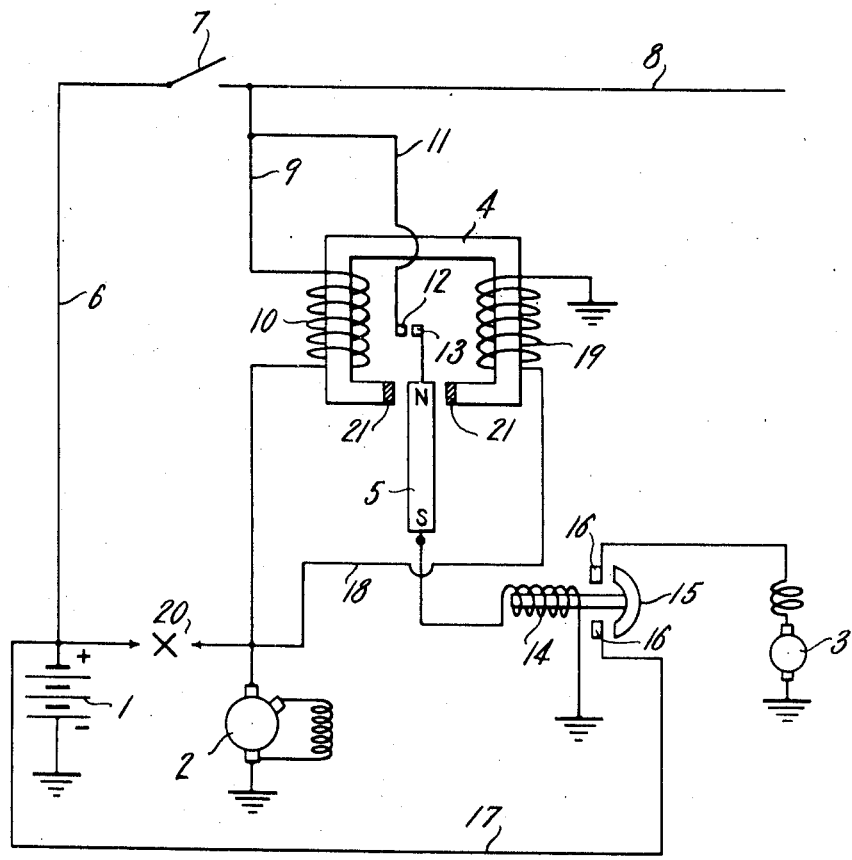
INVENTOR
LUDVIG P. KONGSTED.
BY
ATTORNEY Patented Jan. 22, 1935

1,989,057

UNITED STATES PATENT OFFICE 1,989,057

ELECTRIC RELAY

Ludvig P. Kongsted, Longmeadow, Mass., assignor to United American Bosch Corporation, Springfield, Mass., a corporation of New York Application September 2, 1932, Serial No. 631,481

9 Claims. (Cl. 290—36)

This invention relates to improvements in electric relays; and particularly to an automatic switching relay for controlling the starting of an internal combustion engine on an automobile, truck, or other power-driven vehicle.

An object of the invention is to provide a simple device which can be operated at low cost, and which can be employed in conjunction with the regular ignition system and battery therefor on an automobile or the like to connect in the starting motor to turn the engine over; and then automatically disconnect the motor as soon as the generator begins rotating. In its preferred form the invention comprises a pair of electro-magnets and a polarized armature, with suitable conductors and contacts arranged so that one electro-magnet attracts the armature at first to make the circuit through the starting motor; and the other is then energized by current from the generator to neutralize the first and cause the motor circuit to reopen.

A further object is to provide a cut-out relay for starting motors having means to prevent reestablishment of the motor circuit at low speeds; so that the motor cannot be connected to operate under conditions that might result in damage to the motor.

The nature and advantages of the invention are explained in the ensuing description, taken with the accompanying drawing, and the novel features are pointed out in the appended claims; but the disclosure is explanatory only, and I do not wish to be limited to the exact features of design herein set forth, but reserve the right to make changes that are within the spirit of the invention and do not exceed the scope of the broad and general meanings of the terms in which the claims are expressed.

On the drawing, the figure shows a diagram of the circuits utilized in the practice of the invention.

At 1 is shown an ordinary 6-volt storage battery for starting, lighting and ignition. The electric generator or dynamo connected to be driven by the engine is indicated at 2; and at 3 is the starting electric motor. The circuits for the polarized relay include a pair of electromagnetic windings having a common U-shaped soft iron core 4 and a polarized armature 5 mounted to move between the poles or links of this core. From the positive terminal of the battery leads a conductor 6 having a circuit breaking switch 7 to a main conductor 8, which may be united to the ignition or spark coil; and the negative pole of the battery is of course connected to ground. It should be understood that either terminal of the battery may be grounded as long as the proper connections to correspond are made at the polarized relay. The grounded negative is used in this illustration.

From the conductor 8 a branch conductor 9 leads to an end of an electromagnetic coil 10 on one limb of the core 4, and the opposite extremity of this coil is joined to one terminal of the generator 2, the other generator terminal being grounded. Another branch conductor 11 leads to a fixed contact 12, in position to cooperate with a movable contact 13 of the armature 5. This armature is united by a lead to a solenoid coil 14 having a plunger carrying a contact arm 15 that bridges two contacts 16. These contacts are in the line of a conductor 17 which runs from the positive terminal of the battery 1 to the insulated terminal of the starting motor 3, which has its other terminal grounded by connecting it as usual to the vehicle frame.

Another conductor 18 runs from the insulated terminal of the generator 2 to one end of an electromagnetic coil 19 on the other limb of the core 4 and the opposite extremity of this coil is connected to ground. An automatic cut-out switch 20 is disposed between the positive poles of the battery and generator to prevent discharging of the battery through the generator when this is operated below the required speed for charging.

When the switch 7 is closed, the current passes from the battery to the coil or device 10 and through the low impedance generator armature and ground back to the battery. The armature 5 is thus drawn to the left, closing the contacts 12 and 13. Then current from the battery flows through the coil 14 and moves the plunger to bridge the contacts 16. Hence current can pass to the motor 3 to revolve the latter and start the engine.

The generator armature is of the usual type having an impedance which is approximately one ohm or slightly less. Assuming that the battery 1 is of six volts, then the potential difference between the ends of coil 10 is approximately six volts, since one end is substantially at ground potential. The coil 19 has one end grounded and the other end substantially at ground, therefore any current flow prior to the starting of generator 2, is so small as to be negligible. The coil 19 is wound to have a greater magnetic force at two volts than coil 10 has at six volts. When the generator starts operation, the lead 18 and coil 19 receive their first appreciable current, and when the generator output reaches a potential of between 1.8 and 2 volts, the pole adjacent coil 19 attracts the relay armature 5. Thus the circuit through the contacts 12 and 13 is interrupted. The coil 14 is then deenergized, the conductor 17 is opened at the contacts 16 and the motor is driven no longer. Further, as soon as the voltage of the generator rises to 6 volts, or whatever is the voltage of the battery, there is no more difference of potential between the generator and the point of connection of the wire 9 with the wire 8. Hence no current then flows through the coil 10, and if the voltage of the generator rises above that of the battery, to charge the battery, then the coils 10 and 19 reenforce each other, according to the amount of resistance in circuit 6, 7 and 9, and the armature is attracted all the more to the right hand limb of the core 4.

I also place non-magnetic spacers 21 on the end of the core 4. By these spacers, the amount of magnetic "freezing" is so controlled that the armature 5 is retained against the right hand polepiece of the core 4 till the generator voltage drops to zero. Therefore the switching in and operation of the starting motor at low speeds of the engine is entirely prevented.

With this arrangement the starting motor is fully controlled to start the engine quickly, and then the motor is quickly cut out and all risk of the motor being operated at the wrong instant and sustaining damage is obviated.

Having described the invention, what is believed to be new and desired to be secured and protected by Letters Patent of the United States is:

1. An electric relay for controlling a motor to start an internal combustion engine, comprising a circuit for energizing the motor, means including an electromagnetic core and a polarized armature to close and open said circuit, and non-magnetic spacers on said core to control the amount of magnetic freezing of the polarized armature so as to prevent closing the motor circuit at low engine speeds after the motor has started the engine.

2. An electric relay for controlling a motor to start an internal combustion engine, comprising a circuit for energizing the motor, means including a U-shaped electromagnetic core and a polarized armature between the limbs of said core to open and close said circuit, and non-magnetic spacers at the ends of said core on both sides of the armature to control the amount of magnetic freezing of the polarized armature so as to prevent operation of the motor until after the engine stops.

3. An electric relay for controlling a motor to start an internal combustion engine, comprising a pair of coils, a common electromagnetic core for the coils, a battery and a generator, a circuit from the battery through one of said coils and the generator, a circuit from the battery to the motor, and a polarized armature which is attracted by said coil to close the circuit to the motor, and then after the engine has been started is attracted by the other coil as soon as the latter is energized by current from the generator.

4. An electric relay for controlling a starting motor for an internal combustion engine, comprising a U-shaped soft iron core, an electromagnetic coil on each limb thereof, a circuit comprising a battery and a generator to be driven by the engine including one of said coils, a circuit from the generator to the other coil, the latter being wound to oppose the first, and a polarized armature mounted to be moved by the magnetism of said core, whereby said armature can be first moved by the first-named coil to close the circuit to the motor and then by the other coil, when the latter is supplied with current from the generator, to break the motor circuit.

5. An electric relay for controlling a starting motor for an internal combustion engine, comprising a soft iron core, a pair of electromagnetic coils on the core, a battery and a generator and conductors connecting same in series with one of said coils, a conductor connecting the generator to the other coil, the latter coil being wound to oppose the first, a supply circuit from the battery to the motor, a polarized armature operated by the first-named coil to close the motor circuit, and by the second coil when supplied with generator current to open said motor circuit, and non-magnetic spacers on the ends of the core to control the amount of magnetic freezing so as to retain the armature in position to keep the motor circuit open and prevent the engine after starting from operating the starting motor at low speed.

6. An electric relay for controlling a motor to start an internal combustion engine, comprising a source of electric current, a coil in circuit therewith, a work circuit to be supplied from said source and means comprising a pair of contacts to be closed by the magnetic effect of the coil and accomplish the closure of the work circuit, a second source of electric current and a coil connected to the second source and wound to be magnetically opposed to the first coil to neutralize the magnetic effect of the first coil and enable said contacts to be disengaged from each other and bring about the opening of the work circuit.

7. An electric relay for controlling a motor to start a combustion engine, comprising a source of electric current, a coil in circuit therewith, a work circuit connected to said source, a pair of contacts arranged to be closed by the magnetic effect of said coil and accomplish the closure of the work circuit, a dynamo electric generator adapted to be set in operation after the closure of the work circuit and a second coil in circuit with said generator and wound to be magnetically opposed to the first coil to neutralize the first coil and enable said contacts to separate so that the work circuit can be opened.

8. An electric relay for controlling a motor to start an internal combustion engine, comprising a source of electric current, a coil in circuit therewith, a work circuit to be supplied from said source and means comprising a pair of contacts to be closed by the magnetic effect of the coil and accomplish the closure of the work circuit, a second source of electric current and a coil connected to the second source and wound to be magnetically opposed to the first coil to neutralize the magnetic effect of the first coil and enable said contacts to be disengaged from each other and bring about the opening of the work circuit, the second source of electric current being also in circuit with the first source through said first-named coil.

9. An electric relay for controlling a motor to start an internal combustion engine, comprising a source of electric current, a coil in circuit therewith, a work circuit connected to said source, a pair of contacts arranged to be closed by the magnetic effect of said coil and accomplish the closure of the work circuit, a dynamo electric generator adapted to be set in operation after the closure of the work circuit and a second coil in circuit with said generator and wound to be magnetically opposed to the first coil to neutralize the first coil and enable said contacts to separate so that the work circuit can be opened, the generator being also connected to said source through said first-named coil.

LUDVIG P. KONGSTED